Aug. 20, 1929.  F. LANE  1,724,943
BURR EXTRACTOR AND COTTON CLEANER
Filed Jan. 15, 1927   3 Sheets-Sheet 1
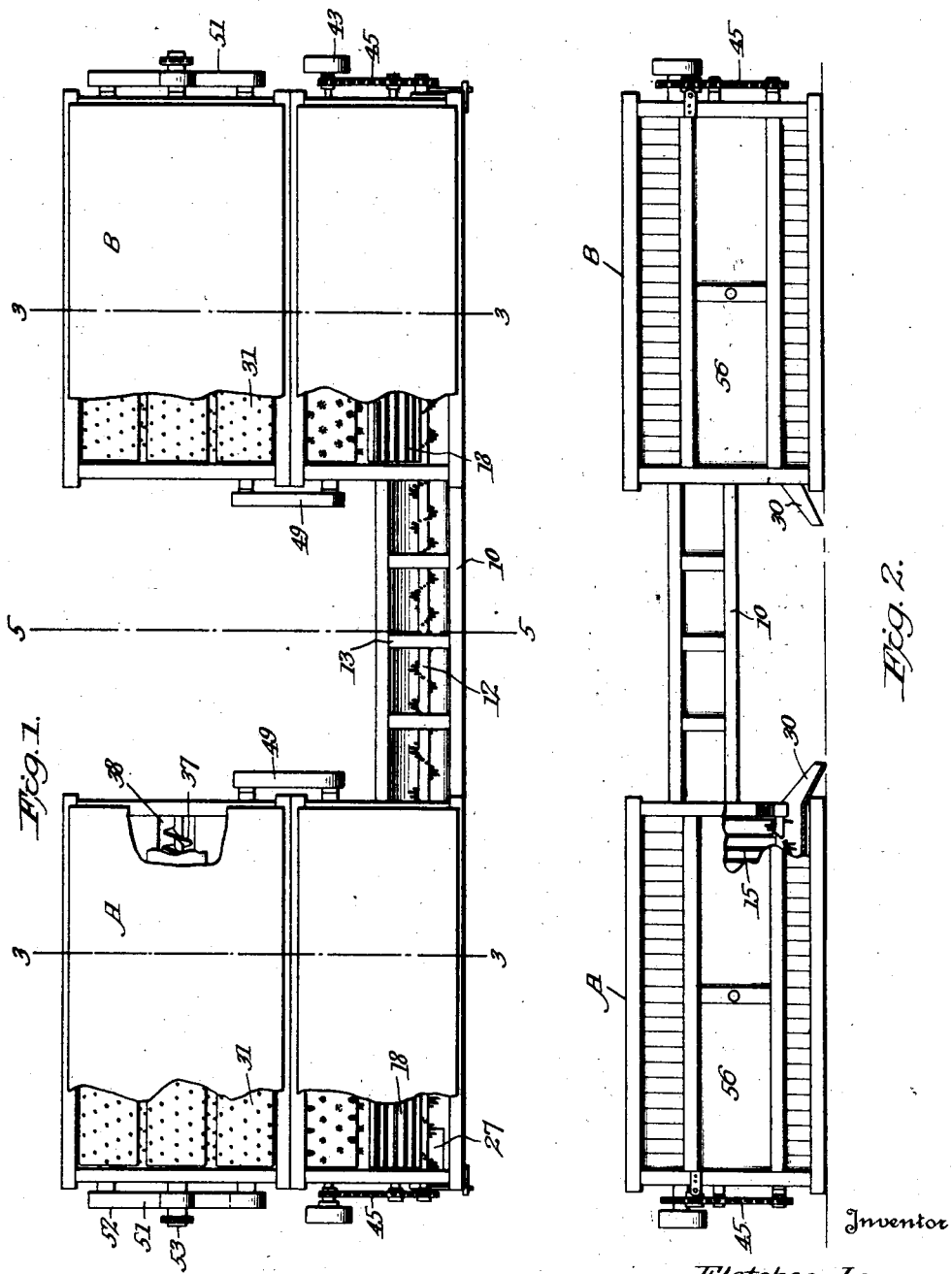
Inventor
Fletcher Lane
By Cushman, Bryant & Darby
Attorneys

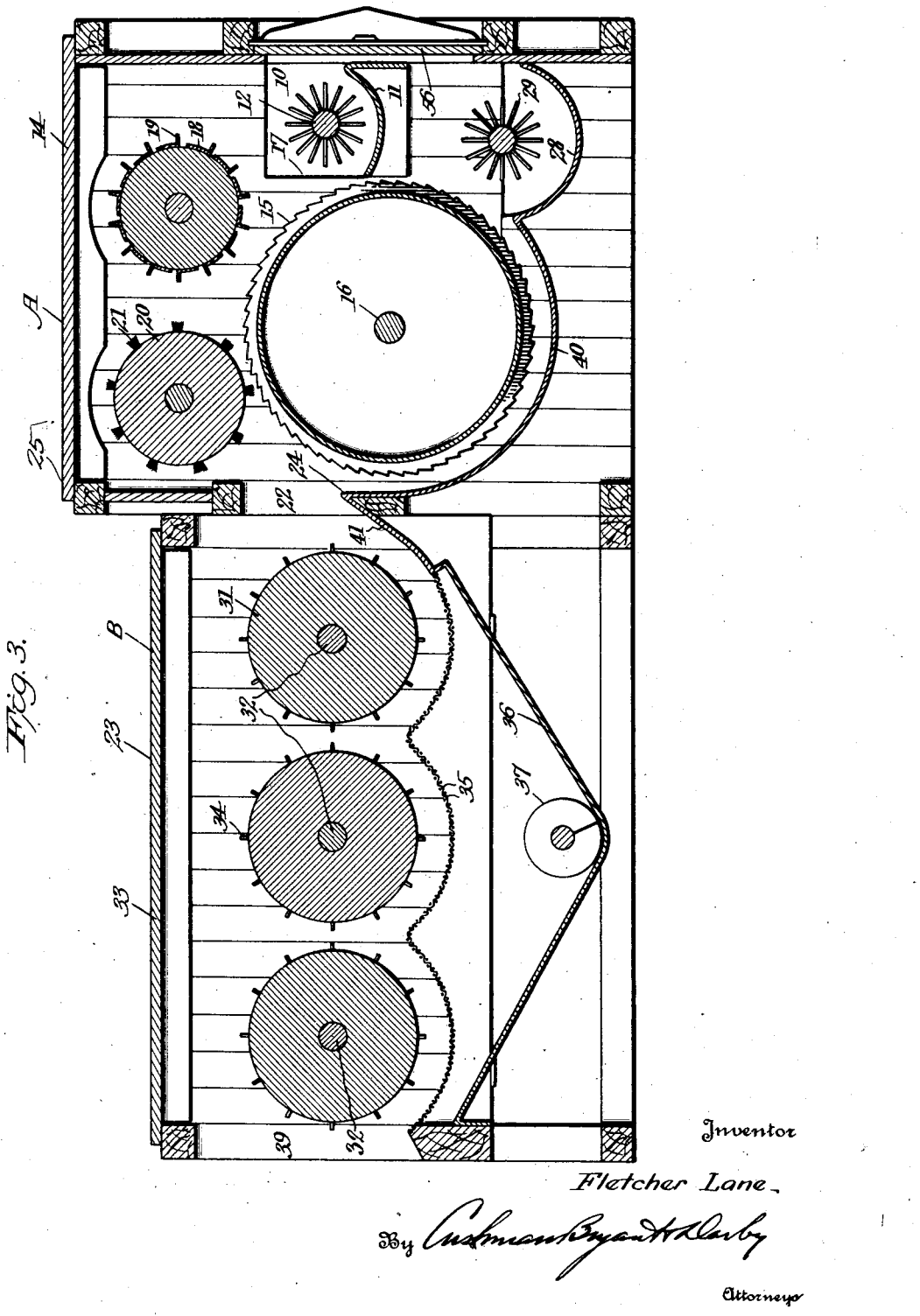

Aug. 20, 1929.                    F. LANE                       1,724,943
                    BURR EXTRACTOR AND COTTON CLEANER
                    Filed Jan. 15, 1927        3 Sheets-Sheet 3
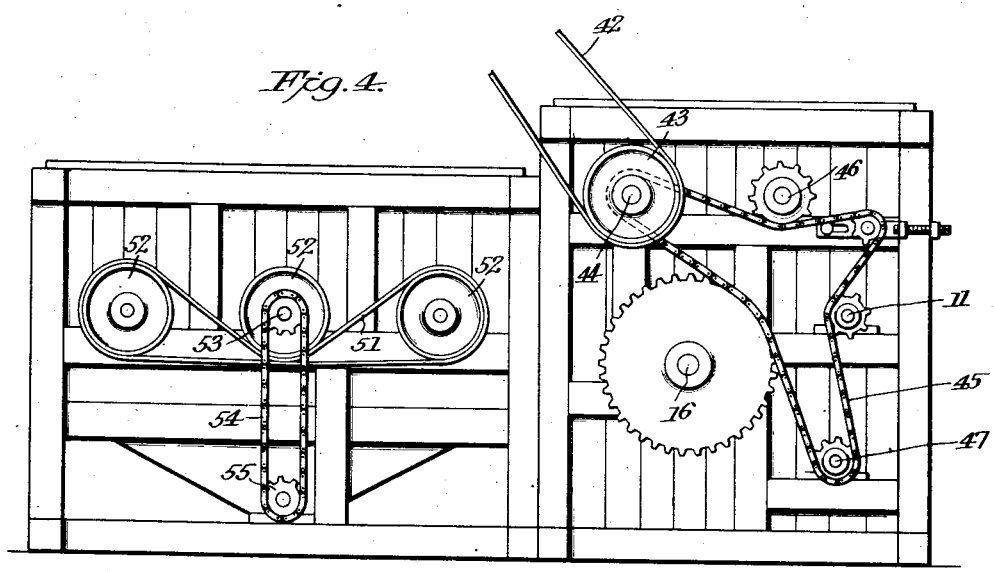
Fig. 4.
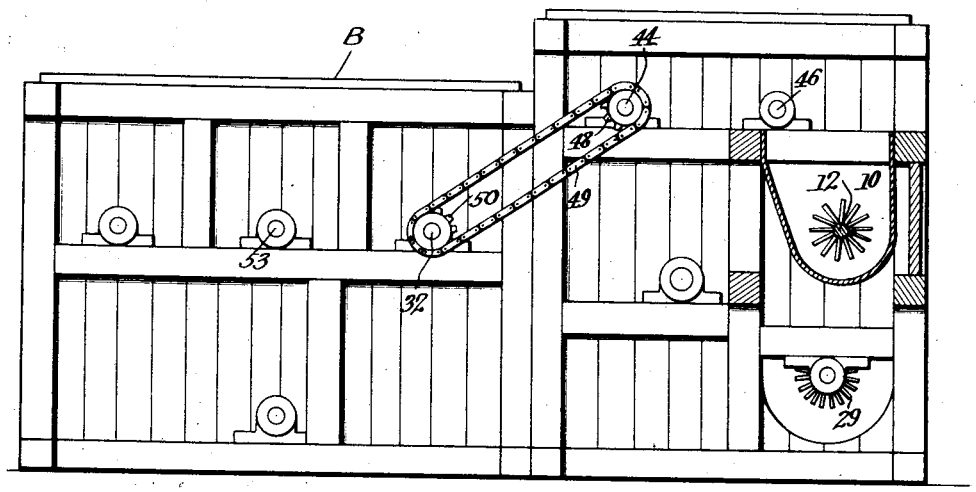
Fig. 5.                                    Inventor
                                        Fletcher Lane
                                    By Cushman Bryant & Darby
                                                Attorneys Patented Aug. 20, 1929.

1,724,943

UNITED STATES PATENT OFFICE.

FLETCHER LANE, OF ELK CITY, OKLAHOMA, ASSIGNOR OF ONE-THIRD TO ELK MANUFACTURING COMPANY, OF ELK CITY, OKLAHOMA, A CORPORATION OF OKLAHOMA, AND ONE-THIRD TO J. D. GARNETT, OF ELK CITY, OKLAHOMA.

BURR EXTRACTOR AND COTTON CLEANER.

Application filed January 15, 1927. Serial No. 161,403.

This invention relates to a machine for hulling cotton bolls.

In this industry, it is primarily necessary that the machine have a large capacity and yet be very simple in its make-up, affording readily replacement of parts as well as access in case of break down or for cleaning purposes.

It is equally important that the various treating members shall smoothly and continuously cooperate with one another so that the fibers will be in good condition for feed to the gin and so that all of the shells and trash will be completely and efficiently withdrawn.

To this end, I have invented a machine which has the advantage of treating a very large quantity of material and of continuously operating to deliver cleaned fiber and dispose of the trash and shells which are thoroughly removed from such fiber.

Referring to the drawings

Figure 1 is a top view partly broken away.

Figure 2 is an end view.

Figure 3 is a sectional view in end elevation.

Figures 4 and 5 are end views showing the manner in which the various parts are operated.

Referring to the drawings, the invention consists of two breaker and cleaner structures A and B.

These breaker cleaner structures are mounted at opposite ends of a conveyor 10 as shown in Figures 1 and 2.

The conveyor 10 comprises a trough 11 within which operates a spiral conveying means 11'. The spiral conveyor consists of a plurality of spirally disposed outwardly projecting pins or rods mounted upon a shaft 12. A plate 13 divides the conveyor trough into two sections, whereby the ends of the conveyor communicate with the respective members A and B.

The turns of the spiral upon the shaft 12 are so arranged that on one side of the separator 13 material is directed into the breaker A while material which finds its way into the opposite side of the separator is transferred to the breaker B.

Since the two members A and B are substantially similar, one thereof will be described. Referring now to Figure 3, it will be seen that material is conveyed into a casing or housing indicated as a whole at 14 and the conveyor 10 extends longitudinally throughout the length of the housing 14.

Arranged in proximity to the conveyor 10 within the housing is a saw assembly 15 shown in Figures 2 and 3, made up of a plurality of toothed members of conventional design.

This saw assembly extends throughout the length of the casing 14 and is mounted upon a shaft 16. Within the casing 14 the conveyor 10 has one wall of the trough 11 cut away as at 17, so that the bolls, fiber, etc. will be picked up by the saw 15. The spirals of the conveyor serve to throw the material or lead it into contact with the saws, and it will be observed that the saws and conveyor are in proximity to each other throughout the longitudinal extent of the casing 14.

Disposed in the casing 14 and above the conveyor 10 and the saw assembly 15 is a breaker roll 18. As shown in Figures 1 and 3, this breaker roll comprises a solid roller upon whose periphery is mounted a plurality of L-shaped or angular metal strips or bars 19 forming lateral projections or ridges upon the roller extending throughout the length thereof.

The breaker roll is revolved, and the projections or ridges act to throw hulls and trash from the saws back into the adjacent trough and conveyor.

Disposed also in proximity to the saw assembly and laterally of the breaker roll 18 within the housing 14 is a roll 20 upon the periphery of which are disposed tufts or stiff bristles 21 as shown in Figures 1 and 3.

The conveyor shaft 12 and the shaft 16 of the saw assembly rotate in the same direction as does the shaft of the roller 18. However, the shaft of the roller 20 rotates in the opposite direction. Therefore, as material is conveyed into relation with the saw assembly, it is picked up and brought into contact with the L-shaped members 19 upon the breaker roll which not only serves to break up the bolls but as well to throw the shells as well as any other trash away from the saw assembly so that they are not passed into contact with the brushing roller 20.

The fiber which clings to the saw teeth passes in proximity to the brushes 21 which sweep off the roller and throw the material past an opening 22 whereby the housing 14 communicates with a second housing 23. This opening is bounded by a buttress or guard 24 extending above the axis of the saw assembly 15 and so placed that the sweeped material from the saw assembly will be thrown through the opening 22.

Referring to Figure 3, it will be seen that the housing 14 is provided with a cover indicated at 25 which is detachable so that the parts may be readily accessible.

Referring to Figure 1, it will be observed that the conveyor trough is provided with an opening 27. The purpose of this opening is to permit any trash and broken shells to pass downwardly and be received in a conveyor 28 mounted at the bottom of the housing having a spiral member 29 revoluble therein for removing the undesirable material at the bottom of the machine through a trough 30 shown in Figure 2.

Thus material entering by means of the conveyor 10 and carried in contact with the saw assembly will be treated during its travel through the conveyor, by the saw assembly and trash will be thrown back into the conveyor by the saw assembly as well as by the breaker roll 18. The trash accumulating in the conveyor 10 will pass out through the opening 27 at the remote end of the machine into the conveyor 28–29 which will pass it in the opposite direction for discharge.

The fiber and other material thrown through the opening 22 is brought into contact with a series of picker and beater rolls 31 which are mounted upon shafts 32 in the housing 23. This housing 23 is provided with a removable cover 33.

The picker rolls are preferably solid and their peripheries are provided with a plurality of spirally disposed projections or pins 34 for acting upon the cotton fiber which is fed thereto. It is to be noted that the shafts 32 are all in the same plane.

Disposed below the picker rollers are screens 35 through which trash and dirt which may be carried with the fiber will be removed. Disposed below the screens is a trough 36 within which is mounted a spiral conveyor 37. At one end the trough 36 is provided with an opening 38 shown in Figure 1 whereby the trash and dirt may be removed from the machine.

The fiber coming in contact with the rollers 31, is disintegrated as by beating, so that the dirt is loosened and caused to pass through the screen 35.

By arranging the rolls 31 in the manner described the cotton fiber is thoroughly treated for the removal of the undesirable mass and the clean fiber is delivered from the housing 23 through the opening 39 at the front of the machine in condition to be fed to the gin.

The machine is very effective because all of the parts are so co-related as to insure a thorough break up of the bolls and the complete removal of the trash as well as the preparation of the fiber for ginning. As the material is fed in at the same time as the trash is removed from the machine, an operator standing at the conveyor 10 between the two machines can observe the nature of the material discharged through the spout or trough 30, and the opening 38.

It is also to be noted that the saw assembly has mounted below it a trough 40 so that any trash accumulating in the trough will be carried around by the saw and emptied into the conveyor 38 for discharge.

The troughs 36, 38 and 40 may be made sectional if desired, but I have found it possible to construct all of these as one integral part.

It will be understood that the screen 35 is attached to the trough 36 at one end and to the upright of the housing at the opposite end, and that the screen extends throughout the entire area of the housing beneath the picker rollers. That part of the trough 36 adjacent the buttress 24 and opening 22 forms a chute 41 for the sweepings thrown through the opening 22 so that the material will be thrown in proximity to the adjacent roller.

Referring to Figures 4 and 5, it will be understood that the operation of a single driven shaft may be utilized to drive the shafts of the various rollers, conveyors and assemblies. Thus power is transmitted by a belt 42 to a pulley 43 upon the shaft 44 for driving the brush member 20. A sprocket chain 45 fits upon suitable sprockets mounted on the shaft 46 of the breaker roll 18, the shaft 16 of the saw assembly, the shaft 12 of the upper conveyor and the shaft 47 of the lower conveyor. All of this structure is arranged upon the outside walls of the machine.

On the interior between the walls of the members A and B, the shaft 44 has a sprocket wheel 48 over which operates a sprocket chain 49 engaging a sprocket 50 mounted upon the shaft 32 of the first roller 31. As shown in Figure 4, the rollers 31 are operated simultaneously in opposite directions by means of a belt 51 engaging pulleys 52 mounted on their respective shafts. The conveyor 37 is operated from the central roller 31 by means of a sprocket 53 and a chain 54 which engages a sprocket 55 on the shaft of the conveyor 37.

In this manner, all of the parts are driven from a single member, and it will, of course, be understood that the shafts of the several rollers, conveyors and assemblies are extended beyond the walls of the housings to permit the attachment of pulleys and sprocket wheels. It will be noted, however, that the feeding conveyor 10 containing the spiral conveyor 11—12, is only operated by its connection with the sprocket chain 45 since by means of the division plate 13 the material will be fed in the opposite direction from such division plate.

By means of this machine not only is the capacity greatly augmented but the amount of power required is materially lessened and a single operator is enabled to prepare an enormous quantity of boll cotton for the ginning operation. At the same time, this operator is always in a position to ascertain how the machine is functioning. This is possible because the first cleanings from the conveyor 10 which are run out through the conveyor 28—29 are deposited by the troughs 30 between the walls of the machine where the operator can readily observe. Moreover, the final screenings are also deposited at the same relative place and can be observed with equal good results.

Moreover, it is possible for the operator to remove the covers 33 and 25 and examine the apparatus while it is in motion, as well as repair or clean any parts which have become broken or clogged.

Referring to Figure 2 and Figure 3, it will be seen that a door is provided in the rear of the housing A indicated at 56, which may be readily opened so that access may be had to the conveyors 10 and 29.

It is also to be observed that the casings A and B may be constructed of wood or metal, and that the casings are suitably reinforced by longitudinal and transverse cross-beams. Thus, the construction is very staunch and at the same time its unitary character is such, that a tremendous volume of material may be treated.

What is claimed is:

1. In an apparatus of the class described, a housing, a saw assembly in said housing, a conveyor extending exteriorly of the housing and longitudinally therethrough in proximity to said saw assembly, said conveyor adjacent the saw assembly having its trough open, a breaker roll mounted in proximity to said saw assembly and adapted to crush the cotton bolls as well as throw the trash and shells back into said conveyor, a plurality of picker rolls, a sweeper roll mounted in proximity to the saw assembly and adapted to brush the fiber therefrom into proximity to one of said picker rolls, said picker rolls having their axes in the same plane and being simultaneously operable.

2. In an apparatus of the class described, a housing, a saw assembly, a breaker roll and sweeper roll mounted in said housing, a conveyor extending exteriorly of the housing for receiving material and passing it in proximity to the saw assembly within the housing, said conveyor having an opening therein at one end whereby trash may be discharged from the conveyor, and a second conveyor within the housing and receiving said trash, said second conveyor discharging the material from the apparatus at a point in proximity to the feeding end of the machine.

3. In an apparatus of the class described, a housing, a saw assembly within the housing, a conveyor extending exteriorly of the housing for receiving material and passing it in proximity to the saw assembly within the housing, said conveyor having a trough open for a portion of its length adjacent the saw assembly, said trough having an opening at one end remote from the end where material is fed, whereby trash may be discharged into a second conveyor mounted below the first conveyor, said second conveyor discharging the trash at the bottom of the apparatus and at the feed end thereof.

4. In an apparatus of the class described, a housing, a saw assembly within the housing, a conveyor extending exteriorly of the housing for receiving material and passing it in proximity to the saw assembly within the housing, said conveyor having a trough open for a portion of its length adjacent the saw assembly, said trough having an opening at one end remote from the end where material is fed, whereby trash may be discharged into a second conveyor mounted below the first conveyor, said second conveyor discharging the trash at the bottom of the apparatus, a sweeper roll mounted in proximity to said saw assembly, said housing having an opening communicating with a second housing, whereby material swept from said saw assembly will be discharged into proximity with picker rolls mounted in said second housing, a screen mounted below said picker rolls and a conveyor mounted beneath said screen for discharging the screenings at the feed end of the apparatus.

5. In an apparatus of the class described, a plurality of machines for hulling cotton bolls, a conveyor for feeding material to said machines, a divider bar in said conveyor, a spiral screw having its turns in a different direction upon the opposite sides of the divider bar whereby the screw may be operated from a single source of power to feed material into each machine, a saw assembly, a beater roll and a picker roll in each machine, the conveyors being extended to carry the material into proximity to said saw assembly, said conveyors having a trough provided with an opening at the end opposite the feed end, and conveyors mounted below said first mentioned conveyors for discharging the trash adjacent the feed end of each machine.

6. In an apparatus of the class described, a saw assembly, a housing, a saw assembly within the housing, a conveyor extending from without the housing and into the housing in proximity to said saw assembly, whereby material may be fed to the conveyor exteriorly of the housing to be conveyed to and acted upon by said saw assembly, the said conveyor acting to pass cotton bolls from one end of the housing to the other adjacent said saw assembly, a trough in which said conveyor moves, a breaker roll adapted to throw trash and hulls back into said conveyor and trough as the material passes adjacent the saw assembly, an opening in said trough adjacent the saw assembly, a second conveyor and trough arranged below said first mentioned conveyor and trough structure, an opening in said first mentioned trough at one end of the housing, whereby trash and hulls may be deposited upon said second conveyor, said second conveyor opening exteriorly of the housing at a point adjacent the feeding end of the first mentioned conveyor.

7. In an apparatus of the class described, a saw assembly, a breaker roll in proximity to said saw assembly and a brusher roll in proximity to said assembly, all of said instrumentalities being arranged in a housing, and a conveyor extending laterally from without the housing into the housing adjacent the said saw assembly, a trough for said conveyor having an opening therein at one end and a second trough arranged below said first mentioned trough, a conveyor mounted in said second trough and adapted to move material in a direction opposite to the propelling movement of the first conveyor, whereby material is fed to the machine on one side of the housing by the first conveyor and débris discharged from the housing on the same side by the second conveyor.

8. In an apparatus of the class described, a saw assembly, a breaker roll in proximity to said saw assembly and a brusher roll in proximity to said assembly, all of said instrumentalities being arranged in a housing, and a conveyor extending laterally from without the housing into the housing adjacent the said saw assembly, a trough for said conveyor having an opening therein at one end and a second trough arranged below said first mentioned trough, a conveyor mounted in said second trough and adapted to move material in a direction opposite to the propelling movement of the first conveyor, whereby material is fed to the machine on one side of the housing by the first conveyor and débris discharged from the housing on the same side by the second conveyor, said housing having an opening therein adjacent the brusher roll and a plurality of breaker rolls adjacent said opening, a screen below said breaker rolls and a conveyor arranged below said screen.

9. The combination with a plurality of machines for hulling cotton bolls, a trough communicating with said machines and having a material feeding means located therein, said means operating to feed material disposed in said trough simultaneously in different directions to the machines from the feeding point, whereby cotton to be treated may be fed to the trough and propelled into proximity with the cleaning instrumentalities of the said machines, and means for discharging trash, hulls and débris from each machine at a point adjacent the feeding means.

10. The combination with a plurality of machines for hulling cotton bolls, a trough communicating with said machines and having a material feeding means located therein, said means operating to feed material disposed in said trough simultaneously in different directions to the machines from the feeding point, whereby cotton to be treated may be fed to the trough and propelled into proximity with the cleaning instrumentalities of the said machines, the said means feeding the cotton into one side of each machine, and means for conveying trash, hulls and débris from each machine and discharging the same on the same side of each machine as the feeding means.

11. The combination with a plurality of machines for hulling cotton bolls, a trough communicating with said machines and having a material feeding means located therein, said means operating to feed material disposed in said trough simultaneously in different directions to the machines from the feeding point, whereby cotton to be treated may be fed to the trough and propelled into proximity with the cleaning instrumentalities of the said machines, the said means comprising a spiral conveyor having the turns thereof from the feeding point arranged to propel material in different directions, and means for discharging trash, hulls and débris from each machine adjacent the feeding means.

12. The combination with a plurality of machines for hulling cotton bolls, of means providing a passage communicating with said machines, said means having a material feeding means located therein and said passage and feeding means extending into operative relation with cleaning instrumentalities in said machines, said feeding means operating to pass material disposed in said passage simultaneously in different directions to the machines from the feeding point, whereby cotton to be treated may be fed to the passage and propelled into proximity with the cleaning instrumentalities of the said machines.

13. The combination with a plurality of machines for hulling cotton bolls, of means providing a passage communicating with said machines, said means having a spiral conveyor therein the turns thereof from the feeding point being arranged to propel material in different directions, said means and said conveyor extending into operative relation with cleaning instrumentalities in said machines and said conveyor operating to feed material in said passage simultaneously in different directions to the cleaning means from a feeding point, whereby cotton to be treated may be fed to the passage and propelled into proximity with the cleaning instrumentalities of the said machines.

In testimony whereof I have hereunto set my hand.

FLETCHER LANE.